US012362118B2

(12) United States Patent
Hoffmann

(10) Patent No.: US 12,362,118 B2
(45) Date of Patent: Jul. 15, 2025

(54) SWITCHING DEVICE

(71) Applicant: TDK Electronics AG, Munich (DE)

(72) Inventor: Robert Hoffmann, Berlin (DE)

(73) Assignee: TDK ELECTRONICS AG, Munich (DE)

(*) Notice: Subject to any disclaimer, the term of this patent is extended or adjusted under 35 U.S.C. 154(b) by 88 days.

(21) Appl. No.: 17/927,186

(22) PCT Filed: Apr. 28, 2021

(86) PCT No.: PCT/EP2021/061105
§ 371 (c)(1),
(2) Date: Nov. 22, 2022

(87) PCT Pub. No.: WO2021/239367
PCT Pub. Date: Dec. 2, 2021

(65) Prior Publication Data

US 2023/0197384 A1 Jun. 22, 2023

(30) Foreign Application Priority Data

May 28, 2020 (DE) ......................... 102020114383.4

(51) Int. Cl.
*H01H 50/02* (2006.01)
*H01H 50/54* (2006.01)

(52) U.S. Cl.
CPC ........ *H01H 50/023* (2013.01); *H01H 50/546* (2013.01); *H01H 2050/025* (2013.01)

(58) Field of Classification Search
CPC ............... H01H 50/023; H01H 50/546; H01H 2050/025; H01H 1/20; H01H 9/302; H01H 51/282; H01H 50/02; H01H 9/443
(Continued)

(56) References Cited

U.S. PATENT DOCUMENTS

| | | | | |
|---|---|---|---|---|
| 9,087,655 | B2 | 7/2015 | Enomoto et al. | |
| 2012/0175345 | A1* | 7/2012 | Tachikawa ............. | H01H 9/443 218/26 |

(Continued)

FOREIGN PATENT DOCUMENTS

| | | | |
|---|---|---|---|
| CN | 107248463 | B | 10/2017 |
| EP | 2942798 | A1 | 3/2017 |

(Continued)

OTHER PUBLICATIONS

Pavlov, Valeri (EP Authorized Officer), International Search Report (with English Translation) and Written Opinion in corresponding International Application No. PCT/EP2021/061105 mailed on Aug. 30, 2021, 21 pages.

(Continued)

*Primary Examiner* — Shawki S Ismail
*Assistant Examiner* — Lisa N Homza
(74) *Attorney, Agent, or Firm* — MH2 Technology Law Group LLP

(57) ABSTRACT

The invention relates to a switching device which has two stationary contacts and a movable contact in a switching chamber. The stationary contacts are arranged next to each other along a longitudinal direction, and the switching chamber has a switching chamber wall with opposing transversal lateral wall parts and opposing longitudinal lateral wall parts. Each of the two stationary contacts is arranged at a distance to one of the transversal lateral wall parts, said distance being shorter than the respective distance to the longitudinal lateral wall parts.

16 Claims, 6 Drawing Sheets

(58) Field of Classification Search
USPC .......................................................... 335/185
See application file for complete search history.

(56) References Cited

U.S. PATENT DOCUMENTS

| | | | | |
|---|---|---|---|---|
| 2013/0106542 | A1* | 5/2013 | Yano ...................... | H01H 50/00 335/185 |
| 2016/0260566 | A1* | 9/2016 | Shima .................... | H01H 50/54 |
| 2018/0144893 | A1 | 5/2018 | Konishi et al. | |
| 2019/0311871 | A1* | 10/2019 | Minowa ................... | H01H 1/64 |
| 2019/0355536 | A1* | 11/2019 | Ozaki .................... | H01H 9/443 |
| 2020/0058458 | A1* | 2/2020 | Hoffmann ............... | C04B 37/02 |
| 2020/0402732 | A1* | 12/2020 | Hoffmann .............. | H01H 1/025 |
| 2020/0402753 | A1* | 12/2020 | Hoffmann .............. | H01H 50/36 |

FOREIGN PATENT DOCUMENTS

| | | | |
|---|---|---|---|
| JP | 2019096474 | A | 6/2019 |
| WO | 2015136731 | A1 | 9/2015 |

OTHER PUBLICATIONS

Japanese Office Action issued in corresponding Japanese Patent Application No. 2022-572598 mailed on Feb. 7, 2024, with English language translation, 7 pages.

* cited by examiner

SWITCHING DEVICE

CROSS-REFERENCE TO RELATED APPLICATIONS

The present application is the national stage entry of International Patent Application No. PCT/EP2021/061105, filed on Apr. 28, 2021, and published as WO 2021/239367 A1 on Dec. 2, 2021, which claims the benefit of priority of German Patent Application No. 10 2020 114 383.4, filed on May 28, 2020, all of which are incorporated by reference herein in their entireties.

FIELD OF THE INVENTION

A switching device is specified.

BACKGROUND

The switching device is embodied, in particular, as a remotely actuated, electromagnetically acting switch, which can be operated by an electrically conductive current. The switching device can be activated via a control circuit and can switch a load circuit. In particular, the switching device can be designed as a relay or as a contactor, in particular as a power contactor. The switching device can particularly preferably be designed as a gas-filled power contactor.

A possible application of such switching devices, in particular power contactors, is the opening and disconnection of battery circuits, for example in motor vehicles such as electrically or partially electrically operated motor vehicles or in applications in the field of renewable energies.

In its function as a safety component, a contactor is usually used in combination with a fuse between a battery, such as a lithium-ion battery, and an electric motor and must be able to disconnect the power source from the load in the event of malfunction. Nowadays, such systems typically operate at voltages of about 450 V. In a next generation of such systems, the electrical voltage may be as high as 800 V. Beyond that, for example in special applications, up to 1500 V DC are required.

The higher the electrical voltage of the application, the greater the challenges posed to the design of the contactor, which must interrupt high currents at said high voltages in the event of a fault. This can lead to electric arcing, which can damage contactor components. Therefore, it is important to extinguish electric arcs as effectively as possible. In addition, it may be advantageous if electric arcing only occurs in regions where the risk of damage is minimized, and it is also desirable if the contactor can be used bidirectionally and thus independently of the direction of current through the contactor.

At least one object of certain embodiments is to specify a switching device.

This object is achieved by subject-matters according to the independent patent claims. Advantageous embodiments and developments of the subject-matters are characterized in the dependent claims and are furthermore revealed in the description below and the drawings.

SUMMARY

According to at least one embodiment, a switching device has at least two fixed contacts and at least one movable contact. The at least two fixed contacts and the at least one movable contact are provided and configured for switching on and off a load circuit that can be connected to the switching device and in particular to the at least two fixed contacts. The movable contact is accordingly movable in the switching device between a non-through-connecting state and a through-connecting state of the switching device in such a way that, in the non-through-connecting state of the switching device, the movable contact is spaced apart from the fixed contacts and is thus galvanically isolated and, in the through-connecting state, has a mechanical contact to the at least two fixed contacts and is thus galvanically connected to the latter. The fixed contacts are thus arranged separately from one another in the switching device and, depending on the state of the movable contact, can be electrically conductively connected to one another by the movable contact or electrically separated from one another.

According to a further embodiment, the switching device has a switching chamber in which the movable contact and the fixed contacts are arranged. The movable contact can in particular be arranged completely in the switching chamber. The fact that a fixed contact is arranged in the switching chamber can in particular mean that at least one contact region of the fixed contact, which is in mechanical contact with the movable contact in the through-connecting state, is arranged within the switching chamber. For connecting a supply line of a circuit to be switched by the switching device, a fixed contact arranged in the switching chamber can be electrically contactable from outside, i.e. from outside the switching chamber. For this purpose, a fixed contact arranged in the switching chamber can protrude with a part from the switching chamber and have a connection possibility for a supply line outside the switching chamber. The switching chamber thus preferably has openings through which the fixed contacts project into the switching chamber. The fixed contacts are, for example, soldered into the openings of the switching chamber and project both into the interior of the switching chamber and out of the switching chamber.

According to a further embodiment, the switching device has a housing in which the movable contact and the fixed contacts are arranged. The movable contact can in particular be arranged completely in the housing. The fact that a fixed contact is arranged in the housing can mean in particular that at least one contact region of the fixed contact, which is in mechanical contact with the movable contact in the switched-through state, is arranged inside the housing. For connecting a supply line of a circuit to be switched by the switching device, a fixed contact arranged in the housing can be electrically contactable from outside, i.e. from outside the housing. For this purpose, a fixed contact arranged in the housing can protrude with a part from the housing and have a connection possibility for a supply line outside the housing. In particular, this can apply to any fixed switching contact.

According to a further embodiment, the contacts are arranged in a gas atmosphere in the housing. This can mean in particular that the movable contact is arranged completely in the gas atmosphere in the housing and that furthermore at least parts of the fixed contacts, for example the contact regions of the fixed contacts, are arranged in the gas atmosphere in the housing. Accordingly, the switching device may particularly preferably be a gas-filled switching device such as a gas-filled contactor. In particular, the gas atmosphere may promote extinction of electric arcs that may occur during switching operations. For example, the gas of the gas atmosphere may comprise or be a hydrogen and/or nitrogen containing gas, particularly at high pressure. Preferably, the gas may have a content of at least 50% $H_2$. In addition to hydrogen, the gas may have an inert gas, particularly preferably $N_2$ and/or one or more noble gases.

According to a further embodiment, the switching chamber is located inside the housing. Furthermore, in particular the gas, i.e. at least part of the gas atmosphere, can be located in the switching chamber.

According to a further embodiment, the movable contact can be moved by means of a magnet armature. For this purpose, the magnet armature can in particular have an shaft that is connected at one end to the movable contact in such a way that the movable contact can be moved by means of the shaft, i.e. is also moved by the shaft when the latter is moved. In particular, the shaft can project into the switching chamber through an opening in the switching chamber. In particular, the switching chamber may have a switching chamber base that has an opening through which the shaft projects. The magnet armature may be movable by a magnetic circuit to effect the switching operations described above. For this purpose, the magnetic circuit may have a yoke that has an opening through which the shaft of the magnet armature protrudes.

During a switching operation, the magnet armature, the shaft and the movable contact preferably move in a linear motion in the form of a lifting or lowering motion in one direction along the shaft. The direction of movement of the movable contact, which corresponds to the main extension direction of the shaft, can also be referred to here and in the following as the vertical direction.

The fixed contacts are arranged in juxtaposition along a longitudinal direction, the longitudinal direction lying in a horizontal plane perpendicular to the vertical direction. The movable contact can be plate-shaped, for example, and have a main extension plane parallel to the horizontal plane. Perpendicular to the vertical and longitudinal directions, a transversal direction is defined so that the horizontal plane is spanned by a longitudinal and transversal direction.

According to a further embodiment, the switching chamber comprises a switching chamber wall. The switching chamber wall may preferably have a rectangular cross-sectional shape or at least a cross-sectional shape approximating a rectangle in a horizontal sectional view, i.e., in a sectional view with a sectional axis perpendicular to the vertical direction. In particular, the switching chamber wall may have opposing longitudinal sidewall parts and opposing transversal sidewall parts that, in a horizontal sectional view, provide the rectangular shape with respect to their outer and/or inner contours. In other words, a longitudinal sidewall part may extend substantially in vertical and longitudinal directions, while a transversal sidewall part may extend substantially in vertical and transversal directions. Here, preferably, the longitudinal sidewall parts, the transversal sidewall parts, and a cover part having openings for the fixed contacts may be integrally formed in one piece to form the switching chamber wall. The switching chamber can additionally have a switching chamber base which, together with the switching chamber wall, forms the switching chamber. Alternatively, the sidewall parts may be integrally formed in one piece with the switching chamber base. Furthermore, the sidewall parts without a cover part and without the switching chamber base can form the switching chamber wall, which together with the separately manufactured cover part and the separately manufactured switching chamber base forms the switching chamber.

According to a further embodiment, each of the fixed contacts has a smaller distance to the respective closer transversal sidewall part than to the longitudinal sidewall parts. In particular, each of the fixed contacts may have a distance T to one of the transversal sidewall parts, the distance T being smaller than a respective distance L to the longitudinal sidewall parts. In other words, each of the fixed contacts has a distance T to the respective closer transversal sidewall part. In particular, the distance T may be measured along the longitudinal direction in each case and may be the same or at least substantially the same for the fixed contacts with respect to the respective closer transversal sidewall part. “Substantially equal” may mean here and hereinafter a deviation of less than 20% and preferably less than 10% from each other. Furthermore, each of the fixed contacts has a distance L from the longitudinal sidewall parts, wherein the distance L can in each case be measured in particular in the transversal direction. Particularly preferably, each of the fixed contacts has an equal or substantially equal distance L to both longitudinal sidewall parts. The distances T and L can particularly preferably refer to the respective minimum distance between an surface of a fixed contact and an inner surface of the respective sidewall part, so that the distances T and L can each be understood as gap or interspace widths between the fixed contacts and the sidewall parts.

Particularly preferably, $T/L \leq 0.5$ or $T/L \leq 0.3$ or $T/L \leq 0.25$ may apply. In other words, the minimum gap between a fixed contact and a longitudinal sidewall part may be at least about twice or at least about three times or preferably at least about four times as large as the minimum gap between the fixed contact and the closer transversal sidewall part.

According to a further embodiment, the fixed contacts and the movable contact are arranged along the longitudinal direction between permanent magnets. In other words, the permanent magnets and the fixed contacts may be arranged in a row-like manner along the longitudinal direction. Particularly preferably, each of the permanent magnets may be arranged on an outer side of a transversal sidewall part facing away from the fixed contacts and the movable contact and thus being outside of the interior of the switching chamber.

The permanent magnets may in particular be so-called blow magnets, which are intended and configured to deflect and thus prolong switching electric arcs, i.e. electric arcs which may occur between a fixed contact and the movable contact during switching operations. The longitudinal arrangement of the permanent magnets deflects switching electric arcs from each of the fixed contacts toward one of the longitudinal sidewall parts. In other words, the permanent magnets can cause switching electric arcs that occur during switching operations between a fixed contact and the movable contact to be deflected in a transversal direction. In particular, the permanent magnets can be arranged translation-symmetrically along the longitudinal direction with respect to their poles. In this way, it can be achieved that the switching electric arcs that may form at one of the fixed contacts are deflected to a different longitudinal sidewall part than the switching electric arcs that may form at the other fixed contact. In other words, the switching electric arcs at the two fixed contacts are deflected in opposite transversal directions and thus toward opposite longitudinal sidewall parts, regardless of the direction of current. This prevents electric arcs that occur simultaneously at both fixed contacts from combining, as this could lead to a short circuit.

Particularly preferably, the distances T between the fixed contacts and the respective closer transversal sidewall part are as small as possible, for example approximately less than or equal to 1/10 or preferably less than or equal to 1/20 of the extent of the switching chamber and, in particular, of the interior of the switching chamber, in the longitudinal direction. In this way, it can be achieved that in each case one of the permanent magnets is placed as close as possible to one of the fixed contacts and thus as close as possible to the starting points of the electric arcs. By the fact that the distance between the longitudinal sidewall parts and the fixed contacts is greater than the distance between the transversal sidewall parts and the fixed contacts, it can be achieved that the electric arcs have sufficient space in the transversal direction to burn and cool down in the free space of the switching chamber. Preferably, the electric arcs hardly reach the switching chamber wall, i.e. in particular the longitudinal sidewall parts, or especially preferably not at all. As a result, the risk of damage to the switching chamber wall by electric arcs can be reduced or even prevented at all.

According to a further embodiment, the switching chamber has an at least approximately square cross-section in a top view along the vertical direction. Furthermore, the longitudinal sidewall parts may have, in the transversal direction, a distance B from each other which substantially corresponds to a distance K of the sides of the at least two fixed contacts facing away from each other in the longitudinal direction. In other words, the switching chamber, and in particular the interior space thereof, has a width B in the transversal direction which substantially corresponds to the space requirement of the arrangement of the fixed contacts in the longitudinal direction. "Substantially corresponding" may here correspond to a deviation of less than or equal to 20%, and preferably of less than or equal to 10%, of said linear measures from each other. Particularly preferably, the switching chamber has a width B in the transversal direction that is slightly smaller than the distance K between the sides of the two fixed contacts facing away from each other in the longitudinal direction.

According to a further embodiment, the switching chamber has at least one web which is arranged along the longitudinal direction between the at least two fixed contacts and which extends from at least one longitudinal sidewall part in the transversal direction into the switching chamber. By means of the at least one web in the interior of the switching chamber, an at least partial separation of the interior of the switching chamber into different arcing chambers can be achieved, i.e. into different spatial regions for the switching electric arcs respectively formed at the fixed contacts. This can significantly increase the insulation capability of the switching chamber.

In particular, the at least one web may extend along the transversal direction in the interior of the switching chamber across the movable contact from one of the longitudinal sidewall parts to the other of the longitudinal sidewall parts. Here, the at least one web may include a recess in which the movable contact may move during switching operations. Further, the at least one web may be directly adjacent to a cover part of the switching chamber. In particular, the at least one web can be formed integrally in one piece with the sidewall parts and/or a cover part of the switching chamber.

According to a further embodiment, the switching chamber has at least two such webs, both of which are arranged in the longitudinal direction between the at least two fixed contacts and each of which extends from at least one longitudinal sidewall part along the transversal direction into the switching chamber. In this case, the webs are spaced apart from each other in the longitudinal direction. In particular, both of the webs may extend in the transversal direction across the movable contact in the interior of the switching chamber from one of the longitudinal sidewall parts to the other of the longitudinal sidewall parts. In particular, the webs may extend along and directly adjacent to a cover part of the switching chamber. The at least two webs may form, between the fixed contacts, one or more spaces in the interior of the switching chamber that are at least partially separated from the fixed contacts and thus electrically insulated. In the at least one insulated space formed in this way, additional components can be arranged such as, for example, additional contacts and/or a gas filling nozzle for filling in the gas described above to form the gas atmosphere in the switching chamber.

Preferably, at least one permanent magnet can be arranged in the switching chamber in the longitudinal direction between the two webs and thus in such a space. Particularly preferably, two permanent magnets can be arranged between the two webs symmetrically with respect to the movable contact, i.e. symmetrically with respect to a symmetry plane spanned by the longitudinal and vertical directions. The one or two permanent magnets arranged in the switching chamber between the webs can additionally be embodied as blow magnets and thus as deflecting magnets for switching electric arcs occurring at the contacts. This makes it possible to arrange further blow magnets inside the switching chamber in addition to blow magnets outside the switching chamber. These can be protected from the switching electric arcs by the webs.

Further advantages, advantageous embodiments and developments are revealed in the exemplary embodiments described below in association with the figures.

DETAILED DESCRIPTION

In the exemplary embodiments and figures, identical, similar or identically acting elements may each be denoted by the same reference signs. The elements illustrated and their mutual proportions should not be considered true to scale; instead, individual elements, for example layers, components, structural elements and regions, may be shown exaggerated in size for better illustration and/or for better understanding.

Figure 1A:
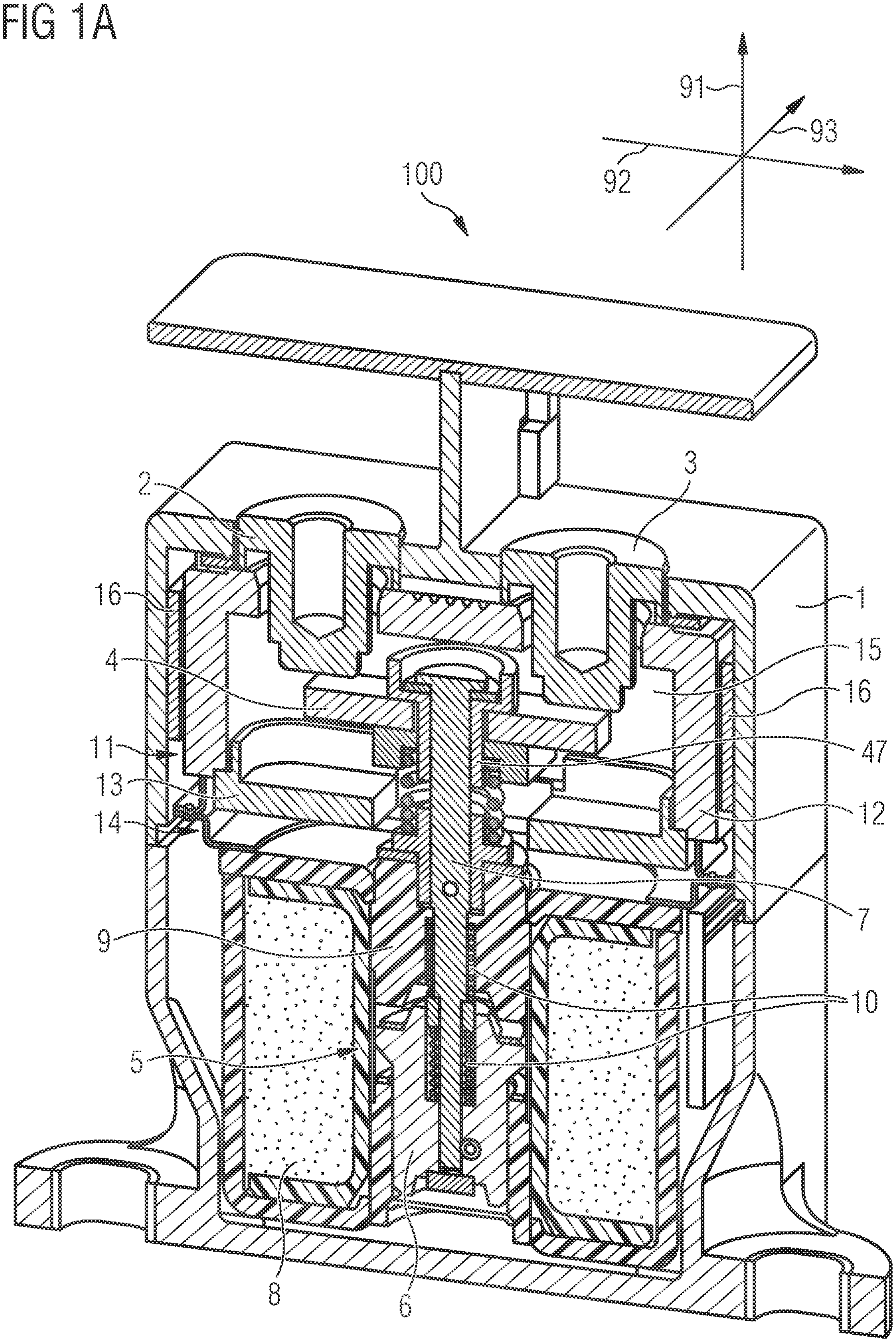
FIGS. 1A to 1D show schematic illustrations of an embodiment of a switching device.
Figure 1B:
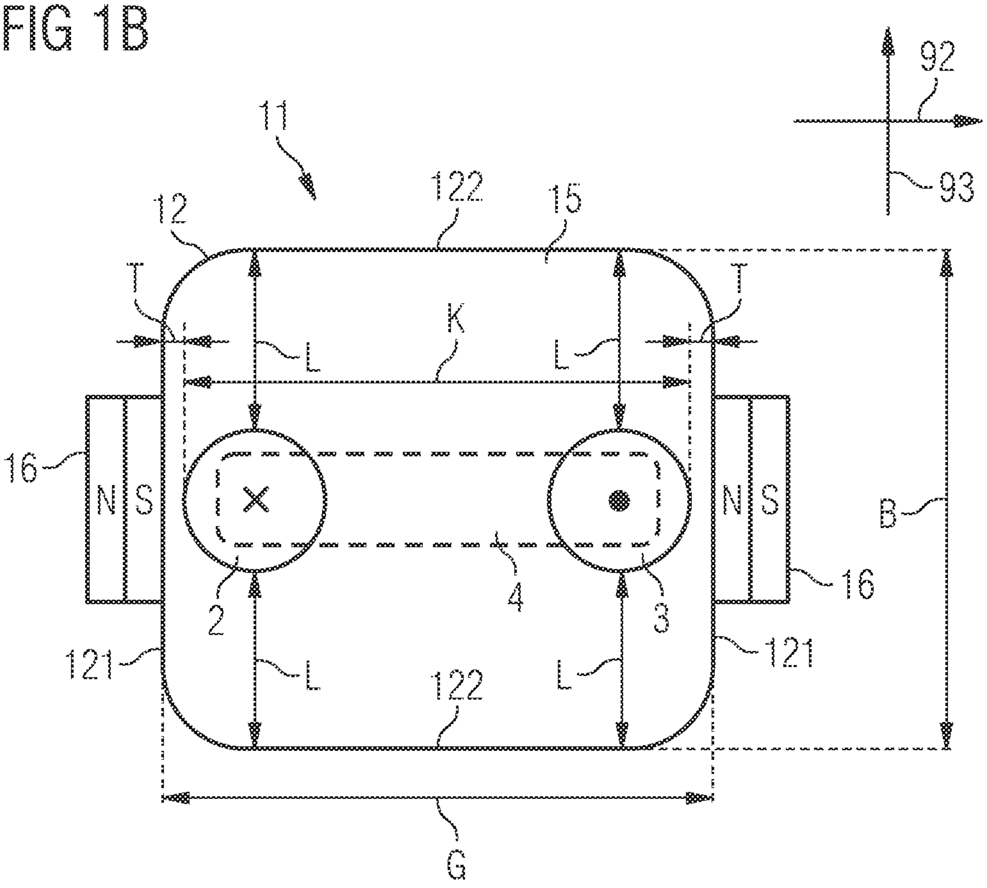
Figure 1C:
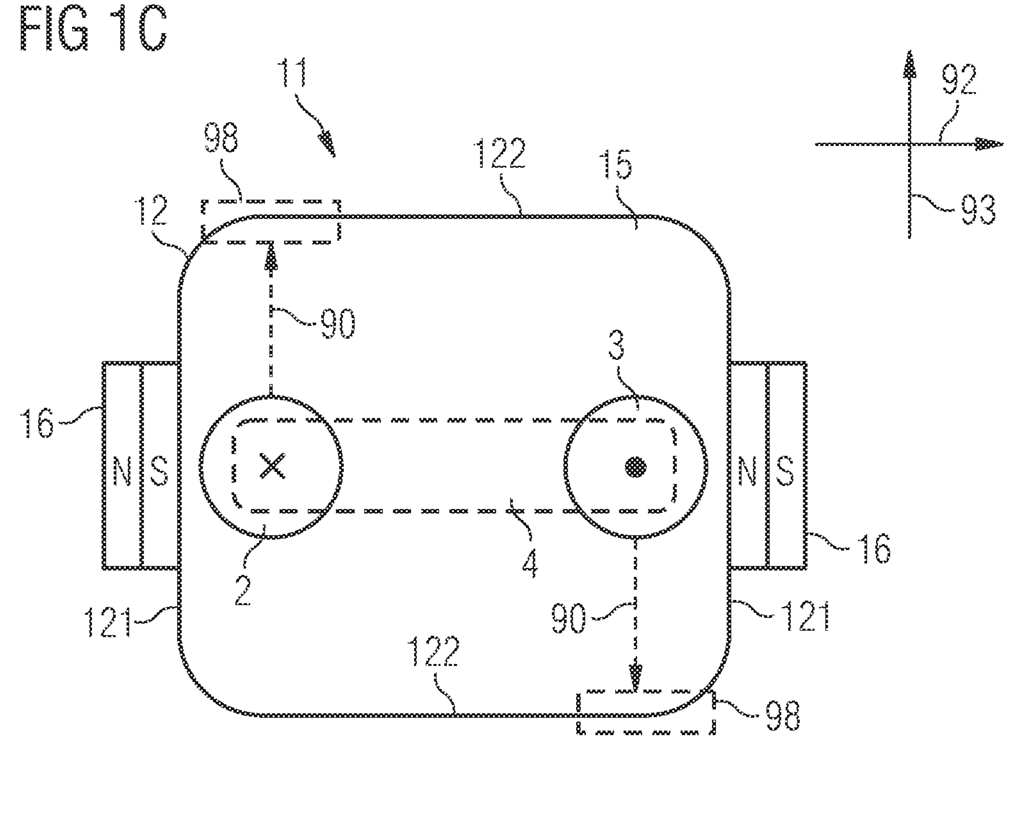
Figure 1D:
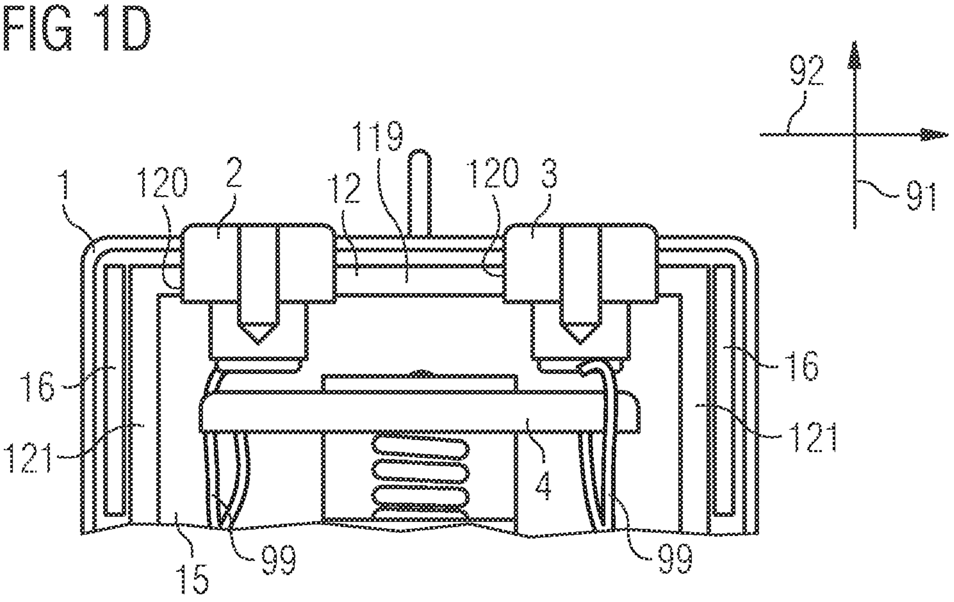

FIGS. 1A to 1D show an embodiment of a switching device 100 which can be used, for example, for switching strong electric currents and/or high electric voltages and which can be a relay or contactor, in particular a power contactor. FIG. 1A shows a three-dimensional sectional view with a vertical sectional plane, while FIGS. 1B to 1D show two-dimensional sectional views through parts of the switching device 100 with a horizontal sectional plane in FIGS. 1B and 1C and a vertical sectional plane in FIG. 1D. The following description refers equally to FIGS. 1A through 1D. The geometries shown are to be understood as merely exemplary and non-limiting, and may also be designed alternatively.

The switching device 100 comprises two fixed contacts 2, 3 and a movable contact 4 in a housing 1. The movable contact 4 is embodied as a contact plate. The fixed contacts 2, 3 together with the movable contact 4 form the switching contacts. As an alternative to the number of contacts shown, other numbers of fixed and/or movable contacts may also be possible. The housing 1 serves primarily as contact protection for the components arranged inside and comprises a plastic or is made of it, for example PBT or glass fiber-filled PBT. The fixed contacts 2, 3 and/or the movable contact 4 can be, for example, with or of Cu, a Cu alloy, one or more refractory metals such as Wo, Ni and/or Cr, or a mixture of said materials, for example of copper with at least one further metal, for example Wo, Ni and/or Cr.

In FIG. 1A, the switching device 100 is shown in a rest state in which the movable contact 4 is spaced apart from the fixed contacts 2, 3, so that the contacts 2, 3, 4 are electrically isolated from each other. The design of the switching contacts shown, and in particular their geometry, are to be understood as purely exemplary and non-limiting. Alternatively, the switching contacts can also be designed differently.

The switching device 100 comprises a movable magnet armature 5 that substantially performs the switching movement. The magnet armature 5 comprises a magnetic core 6, for example with or made of a ferromagnetic material. Furthermore, the magnet armature 5 comprises a shaft 7 which is guided through the magnetic core 6 and is fixedly connected to the magnetic core 6 at one shaft end. At the other shaft end opposite the magnetic core 6, the magnet armature 5 comprises the movable contact 4, which is also connected to the shaft 7. The shaft 7 can preferably be made with or of stainless steel. An insulator 47, which may also be referred to as a bridge insulator, may be arranged between the movable contact 4 and the shaft 7 to electrically insulate them.

The magnetic core 6 is surrounded by a coil 8. A current flow in the coil 8, which can be switched on from the outside by a control circuit, generates a movement of the magnetic core 6 and thus of the entire magnet armature 5 in the axial direction until the movable contact 4 contacts the fixed contacts 2, 3. In the illustration shown, the magnet armature moves upward. The magnet armature 5 thus moves from a first position, which corresponds to the rest state shown and at the same time to the disconnecting, i.e. non-through-connecting and thus switched-off state, to a second position, which corresponds to the active, i.e. through-connecting and thus switched-on state. In the active state, contacts 2, 3, 4 are galvanically connected to each other.

For guiding the shaft 7 and thus the magnet armature 5, the switching device 100 has a yoke 9, which may comprise or be pure iron or a low-doped iron alloy and which forms part of the magnetic circuit. The yoke 9 has an opening in which the shaft 7 is guided. When the current flow in the coil 8 is interrupted, the magnet armature 5 is moved back to the first position by one or more springs 10. In the embodiment shown, the magnet armature 5 thus moves back down. The switching device 100 is then again in the rest state, in which the contacts 2, 3, 4 are open.

The direction of movement of the magnet armature 5 and thus of the movable contact 4 is also referred to in the following as vertical direction 91. The direction of arrangement of the fixed contacts 2, 3, which is perpendicular to the vertical direction 91, is referred to in the following as longitudinal direction 92. The direction perpendicular to the vertical direction 91 and perpendicular to the longitudinal direction 92 is hereinafter referred to as transversal direction 93. The directions 91, 92 and 93, which also apply independently of the described switching movement, are indicated in the figures to facilitate orientation.

For example, when opening the contacts 2, 3, 4, at least one electric arc 99 can be generated as indicated in FIG. 1D, which can damage the contact surfaces of the contacts 2, 3, 4. As a result, there may be a risk that the contacts 2, 3, 4 may "stick" to each other due to a welding caused by the electric arc and may no longer be separated from each other. The switching device 100 then continues to be in the switched-on state, although the current in the coil 8 is switched off and thus the load circuit should be disconnected. In order to prevent such electric arcs from occurring, or at least to assist in extinguishing electric arcs that do occur, the contacts 2, 3, 4 are arranged in a gas atmosphere, so that the switching device 100 is embodied as a gas-filled relay or gas-filled contactor. For this purpose, the contacts 2, 3, 4 are arranged within a switching chamber 11, formed by a switching chamber wall 12 and a switching chamber base 13, in a gas-tight region 14 formed by a hermetically sealed part, wherein the switching chamber 11 may be part of the gas-tight region 14. The gas-tight region 14 completely surrounds the magnet armature 5 and the contacts 2, 3, 4, except for parts of the fixed contacts 2, 3 provided for external connection. The gas-tight region 14 and thus also the interior 15 of the switching chamber 11 are filled with a gas. The gas-tight region 14 is essentially formed by parts of the switching chamber 11, the yoke 9 and additional walls. The gas, which can be filled into the gas-tight region 14 through a gas filling nozzle as part of the manufacturing of the switching device 100, can particularly preferably be hydrogen-containing, for example with 20% or more $H_2$ in an inert gas or even with 100% $H_2$, since hydrogen-containing gas can promote the extinguishing of electric arcs.

The switching chamber wall 12 and the switching chamber base 13 can, for example, be made with or from a metal oxide such as $Al_2O_3$. Furthermore, plastics with a sufficiently high temperature resistance are also suitable, for example a PEEK, a PE and/or a glass fiber-filled PBT. Alternatively or additionally, the switching chamber 11 can also comprise, at least in part, a POM, in particular with the structure $(CH_2O)_n$. Such plastic may be characterized by a comparatively low carbon content and a very low tendency to form graphite. Due to the equal proportions of carbon and oxygen, particularly in the case of $(CH_2O)_n$, predominantly gaseous CO and $H_2$ can be formed during a heat-induced and, in particular, an electric arc-induced decomposition. The additional hydrogen can enhance electric arc quenching.

FIGS. 1B and 1C show schematic sectional views of the switching chamber 11 in a horizontal sectional plane perpendicular to the vertical direction 91. For the sake of clarity, the switching chamber wall 12 and the contacts 2, 3, 4 are simplified in FIGS. 1B and 1C by being indicated only by lines, with the movable contact 4 lying outside the sectional plane shown and being indicated only to improve comprehensibility. Furthermore, an exemplary current direction is indicated in the fixed contacts 2, 3, according to which a load current in the switched-on state of the switching device 100 would flow from the outside through the fixed contact 2 to the movable contact 4 and through the movable contact 4 back through the fixed contact 3 to an external connection. In FIG. 1D, a schematic sectional view of a portion of the switching device 100 in a vertical sectional plane is also shown in a simplified view.

The switching chamber wall 12 has a rectangular cross-sectional shape, or at least a cross-sectional shape approximating a rectangle, in the horizontal sectional view, which may have rounded corners, for example, as shown. The switching chamber wall 12 has opposing transversal sidewall parts 121 and opposing longitudinal sidewall parts 122 that provide the at least approximated rectangular shape. The transversal sidewall parts 121, the longitudinal sidewall parts 122 and a cover part 119 having openings 120 for the fixed contacts 2, 3 are integrally formed in one piece as indicated in the shown embodiment and form the switching chamber wall 12. Alternatively, the sidewall parts 121, 122 may be integrally formed in one piece with the switching chamber base 13. Furthermore, the sidewall parts 121, 122 without a cover part and without the switching chamber base can form the switching chamber wall 12, which can then form the switching chamber 11 together with the separately manufactured cover part and the separately manufactured switching chamber base 13.

Each of the fixed contacts 2, 3 has a smaller distance to the respective closer transversal sidewall part 121 than to the longitudinal sidewall parts 122. As indicated in FIG. 1B, each of the fixed contacts 2, 3 has a distance T to one of the transversal sidewall parts 121, namely the closer transversal sidewall part 121. Furthermore, each of the fixed contacts 2, 3 has a distance L to the longitudinal sidewall parts 122, wherein the distance L of each of the fixed contacts 2, 3 to each of the longitudinal sidewall parts 122 may be the same or different. In particular, as can be seen, the distance T may be measured along the longitudinal direction 92 and may be the same or at least substantially the same for each of the fixed contacts 2, 3 with respect to the respective closer transversal sidewall part 121, i.e. may differ from each other by less than 20% and preferably by less than 10%. The distance L can be measured as described and shown in FIG. 1B respectively between each fixed contact 2, 3 and each longitudinal sidewall part 122 in the transversal direction. The distance L discussed here and in the following may denote the smaller distance of each of the fixed contacts 2, 3 from the longitudinal sidewall parts 122, where the relation $T<L$ applies to all fixed contacts 2, 3 and the associated distances T and L. Particularly preferably, each of the fixed contacts 2, 3 has an equal or substantially equal distance L to both longitudinal sidewall parts 122. As can be seen, the distances T and L represent gap or space widths between the fixed contacts 2, 3 and the sidewall parts 121, 122 and relate to the respective minimum distance between a surface of a fixed contact 2, 3 and an inner surface of the respective sidewall part 121, 122.

In particular, $T/L\leq 0.5$ or preferably $T/L\leq 0.3$ or particularly preferably $T/L\leq 0.25$ applies, so that the minimum gap between a fixed contact 2, 3 and a longitudinal sidewall part 122 is at least about twice or preferably at least about three times or particularly preferably at least about four times as large as the minimum gap between the fixed contact 2, 3 and the closer transversal sidewall part 121.

As indicated in FIGS. 1B and 1C, the switching chamber 11 has an at least approximately square cross-section in a horizontal sectional plane. Furthermore, the longitudinal sidewall parts 122 preferably have a distance B from each other in the transversal direction 93 which substantially corresponds to a distance K of the sides of the two fixed contacts 2, 3 facing away from each other in the longitudinal direction 91. Particularly preferably, the switching chamber has a width B in the transversal direction which is equal to or slightly smaller than the distance K of the sides of the two fixed contacts 2, 3 facing away from each other in the longitudinal direction.

As can further be seen in FIGS. 1A to 1D, permanent magnets 16, so-called blow magnets, are provided outside the switching chamber 11, the magnets being provided and arranged for deflecting the electric arcs 99 indicated in FIG. 1D. In particular, the permanent magnets 16 have the effect of lengthening the electric arc gap and can thus improve the extinguishing of the electric arcs 99. Each of the permanent magnets 16 is disposed on an outer surface of a transversal sidewall part 121 facing away from the fixed contacts 2, 3 and the movable contact 4, and thus outside the interior 15 of the switching chamber 11. The fixed contacts 2, 3 and the movable contact 4 are arranged between the permanent magnets 16 particularly along the longitudinal direction 92 so that the permanent magnets 16 and the fixed contacts 2, 3 are arranged in a row along the longitudinal direction 92.

The longitudinal arrangement of the permanent magnets 16 causes electric arcs 99 from each of the fixed contacts 2, 3 to be deflected in the direction of one of the longitudinal sidewall parts 122, so that electric arcs 99 occurring during switching operations between a fixed contact 2, 3 and the movable contact 4 can be caused by the permanent magnets 16 to be deflected in a transversal direction 93, as indicated in FIG. 1C in the form of the deflection directions 90. As can be further seen in FIGS. 1B and 1C, the permanent magnets 16 are arranged translation-symmetrically along the longitudinal direction 92 with respect to their poles. This allows electric arcs 99 that may form at the fixed contact 2 to be deflected toward a different longitudinal sidewall part 122 than electric arcs 99 that may form at the fixed contact 3. When the load current direction indicated in the fixed contacts 2, 3 is reversed, the deflection directions 90 are reversed in each case. Thus, the electric arcs 99 at the two fixed contacts 2, 3 are deflected in opposite transversal directions 93, and thus to opposite longitudinal sidewall parts 122, regardless of the load current direction. This bipolarity can always prevent electric arcs 99 that occur simultaneously at both fixed contacts 2, 3 from combining, irrespective of the load current direction.

Particularly preferably, the distances T between the fixed contacts 2, 3 and the respective closer transversal sidewall part 121 are as small as possible, preferably about less than or equal to 1/10 or particularly preferably less than or equal to 1/20 of the longitudinal extent G of the switching chamber 11 in the longitudinal direction 92. In this way, it can be achieved that in each case one of the permanent magnets 16 is placed as close as possible to one of the fixed contacts 2, 3 and thus as close as possible to the starting points of the electric arcs 99. In FIG. 1C, the regions 98 of the switching chamber wall 12 are indicated in the direction of which the electric arcs 99 could be directed. By the fact that the distance L between the longitudinal sidewall parts 122 and the fixed contacts 2, 3 is greater than the distance T between the transversal sidewall parts 121 and the fixed contacts 2, 3, it can be achieved that the electric arcs 99 have sufficient space in the transversal direction 93 to burn and cool down in the free space of the switching chamber 11, preferably without reaching the switching chamber wall 12, i.e. in particular the longitudinal sidewall parts 122. In this way, the risk of damage to the switching chamber wall 12 by electric arcing can be reduced or even completely prevented.

Figure 5:
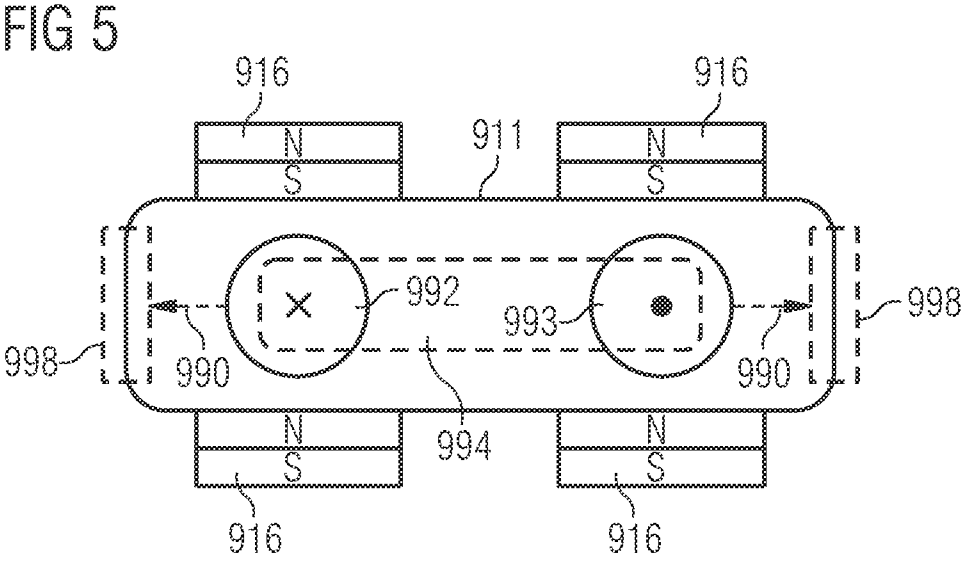
FIG. 5 shows a schematic illustration of a conventional switching chamber.

FIG. 5 shows for comparison the switching chamber 911 of a conventional contactor with fixed contacts 992, 993 and a movable contact 994 corresponding to the view of FIGS. 1B and 1C. The conventional contactor has a switching chamber 911 which has a usual elongated configuration in the longitudinal direction corresponding to the shape and arrangement of the contacts 2, 3, 4. The blow magnets 916 are arranged on the longer longitudinal sides of the switching chamber 911. If this contactor is switched off when current flows through the contacts 992, 993, 994 with the current preferential direction shown, the electric arcs travel to the short transverse outer sides of the switching chamber 911 as indicated by the deflection directions 990. The temperature load is highest in the regions 998 marked by the dashed boxes. If this is to be lowered, the switching chamber 911 would have to be extended in the longitudinal direction to increase the distance. However, this is typically not easily possible in common contactors due to the external housing dimensions. Another disadvantage of the usual embodiment shown is the lack of bipolarity with respect to the load current direction. Indeed, if this were reversed, the electric arcs generated at the fixed contacts 992, 993 would run towards each other in the opposite direction to the deflection directions 990 shown and would cause a direct short circuit. A different arrangement of the blow magnets 916 could result in bipolarity, but would result in very high temperature stresses on the switching chamber wall because the electric arcs would not have sufficient space to form, burn in free space, and cool. This could easily lead to the formation of cracks in the switching chamber wall or even melting of the housing material.

In the switching device 100 described in connection with FIGS. 1A to 1D, on the other hand, it can be achieved, in the manner described, that the quenching capability can be significantly improved compared to a conventional contactor. Due to the described geometry, an increased distance between the contact points of the electric arcs 99 and the inner wall of the switching chamber 11 can be achieved, resulting in a significantly lower load for the switching chamber wall. Due to the described shape of the discharge space formed by the switching chamber 11, which is preferably essentially square, the permanent magnets 16 for deflecting the electric arcs 99 can also be brought significantly closer to the electric arc attachment points, which results in additional advantages. In addition, bipolarity of the switching device 100 is enabled since the electric arcs 99 can be extinguished equally well regardless of the direction of the load current flowing through the contacts 2, 3, 4. In particular, the discharge space provides sufficient space for the electric arcs 99 to deflect in the transversal direction 93 and thus perpendicular to the main extension direction of the movable contact 4, since the distance of the fixed contacts 2, 3 to the longitudinal sidewall parts 122 is greater than the respective nearest transversal sidewall part 121.

Figure 2:
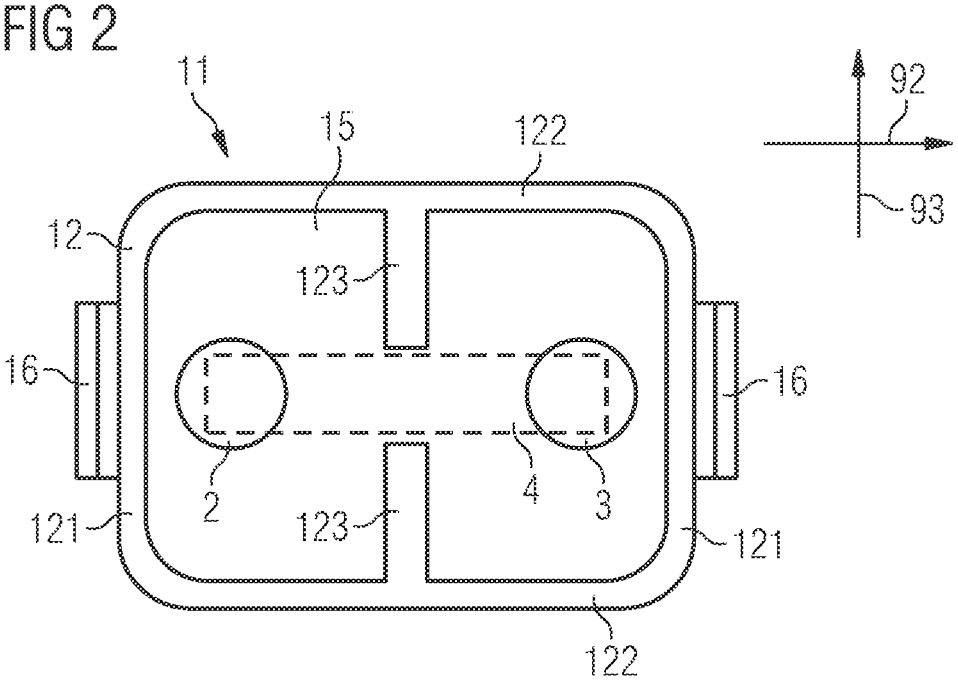
FIG. 2 shows a schematic illustration of a switching chamber for a switching device according to a further embodiment.
Figure 3A:
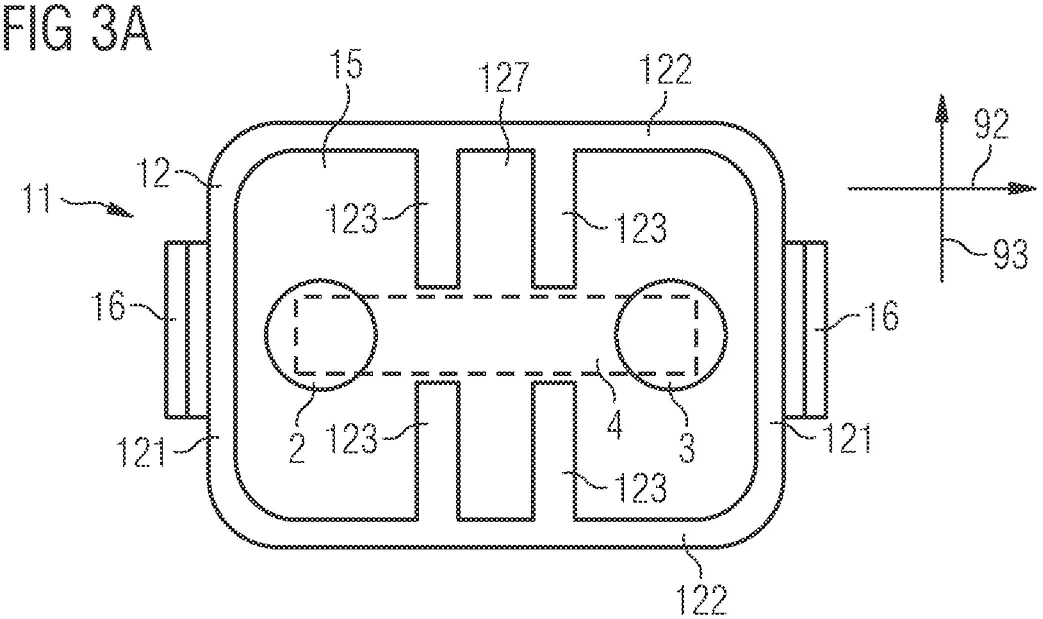
FIGS. 3A to 3C show schematic illustrations of a switching chamber and a switching chamber wall for an switching device according to a further embodiment.
Figure 3B:
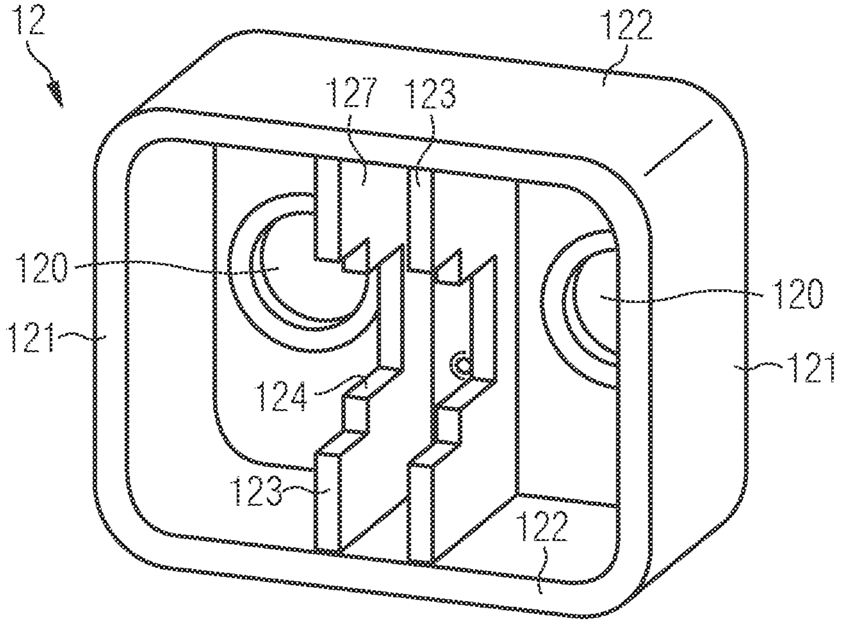
Figure 3C:
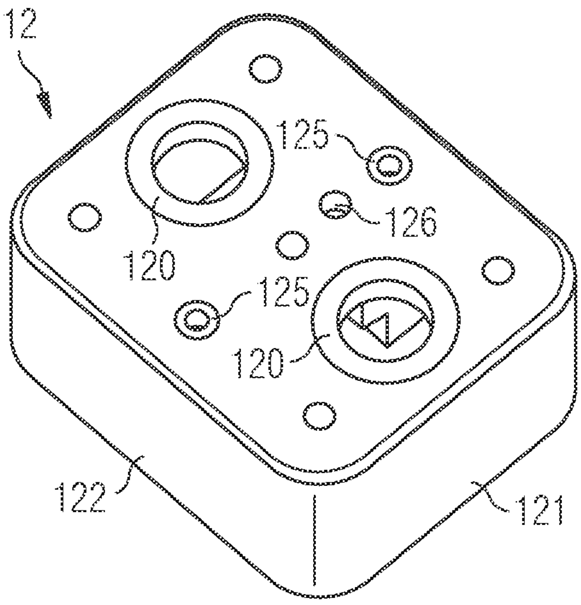
Figure 4:
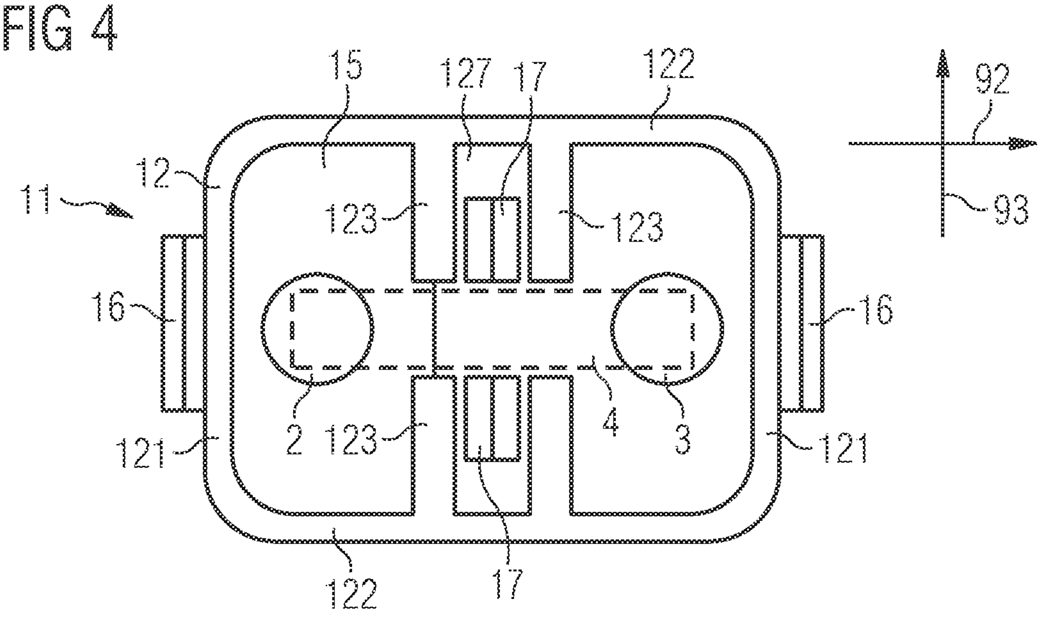
FIG. 4 shows a schematic illustration of a switching chamber for a switching device according to a further embodiment.

In connection with FIGS. 2 to 4, further embodiments of switching chambers 11 for the switching device 100 are described. The description of the following figures is essentially limited to the differences from the respective preceding embodiments. Features and characteristics of features not explicitly mentioned may be implemented as already described in the respective preceding embodiments.

In FIG. 2, the switching chamber wall 12 of the switching chamber 11 is shown in a schematic sectional view corresponding to the view shown in FIGS. 1B and 1C, again indicating the positions of the contacts 2, 3, 4. In this embodiment, the switching chamber 11 has at least one web 123 which is arranged in a direction along the longitudinal direction 92 between the at least two fixed contacts 2, 3 and which extends from at least one longitudinal sidewall part 122 in a transversal direction 93 into the interior 15 of the switching chamber 11. In the embodiment shown, one web 123 is indicated on each of the longitudinal sidewalls 122. The two webs 123 may also be formed, as shown in particular in the following embodiment, as one web extending in transversal direction 93 in the interior space 15 of the switching chamber 11 across the movable contact 4 from one of the longitudinal sidewall parts 122 to the other of the longitudinal sidewall parts 122. Here, the web 123 may have a recess in which the movable contact 4 can move during switching operations. By means of the at least one web 123 in the interior space 15 of the switching chamber 11, an at least partial separation of the interior space 15 into different regions forming arcing chambers separate from one another can be achieved, i.e. different spatial regions for the switching electric arcs respectively formed at the fixed contacts 2, 3. As a result, the insulation capability of the switching chamber 11 can be substantially increased. The web 123 is part of the switching chamber wall 12 and can, in particular, be formed integrally in one piece with the switching chamber wall 12.

FIGS. 3A to 3C show another embodiment of a switching chamber 11 for the switching device 100, wherein the view of FIG. 3A corresponds to the view of FIG. 3. FIGS. 3B and 3C show three-dimensional views of the switching chamber wall 11. As can be seen in FIGS. 3A to 3C, the switching chamber 11 of this embodiment has two webs 123, both of which are arranged in the longitudinal direction 92 between the fixed contacts 2, 3, the webs 123 being spaced apart in the longitudinal direction 92. Thereby, both webs 123 extend in transversal direction 93 across the movable contact 4 in the interior 15 of the switching chamber 11 from one of the longitudinal sidewall parts 122 to the other of the longitudinal sidewall parts 122. The webs 123 each comprise a recess 124 in which the movable contact 4 can move during switching operations. Further, the webs 123 extend along and immediately adjacent to the cover part 119 of the switching chamber 11. As can be seen in FIG. 3B, the sidewall parts 121, 122, the cover part 119, and the webs 123 are formed integrally in one piece in the illustrated embodiment.

The webs 123 form a region in the interior 15 between the fixed contacts 2, 3 which is at least partially separated from the fixed contacts 2, 3 and thus electrically insulated. In the insulated space 127 formed in this way, additional components can be arranged such as, for example, additional contacts and/or a gas filling nozzle for filling in the gas described above to form the gas atmosphere in the switching chamber. In FIG. 3C, corresponding openings 125 for additional contacts and an opening 126 for a gas filling nozzle are indicated.

FIG. 4 shows a further embodiment for a switching chamber 11 for the switching device 100, in which the switching chamber wall 12 is formed as described above and in which permanent magnets 17 are arranged in the longitudinal direction 92 between the two webs 123 and thus in a space 127 at least partially separated from the fixed contacts 2, 3 in the interior 15 of the switching chamber 11. As shown, these permanent magnets 17, which may be present in addition to or also as an alternative to the permanent magnets 16 mounted outside the switching chamber 11, are particularly preferably arranged between the two webs 123 symmetrically with respect to the movable contact 4, i.e. symmetrically with respect to a symmetry plane spanned by the longitudinal and the vertical directions. The space 127 is correspondingly symmetrical. Other numbers of webs and permanent magnets in the switching chamber 11 to form one or more other spaces are also possible. The permanent magnets 17 arranged in the switching chamber 11 between the webs 123 can, in particular, additionally be embodied as blow magnets and thus as deflecting magnets for switching electric arcs occurring at the contacts 2, 3, 4. This makes it possible, alternatively or particularly preferably additionally to blow magnets outside the switching chamber 11 such as the permanent magnets 16 shown, to arrange further blow magnets inside the switching chamber 11. The webs 123 protect the latter from switching electric arcs.

As explained with reference to FIGS. 2 to 4, the provision of at least one additional web 123 in the interior 15 of the switching chamber 11 can create at least separate "arcing chambers" in the interior 15 which can significantly increase the insulation capabilities. By providing multiple webs 123, one or more spaces in the form of at least partially insulated chambers can be created for additional components, which can then no longer come into contact with the switching electric arcs. Further, as described, at least one space can be created within the discharge space that not only extend the insulation distances and improve insulation resistance, but in which additional permanent magnets can be placed.

The features and exemplary embodiments described in association with the figures can be combined with one another according to further exemplary embodiments, even if not all combinations have been explicitly described. The exemplary embodiments described in association with the figures can furthermore alternatively or additionally have further features according to the description in the general part.

The description based on the exemplary embodiments does not restrict the invention thereto. Instead, the invention comprises any novel feature and any combination of features, which, in particular, includes any combination of features in the claims, even if this feature or this combination itself is not explicitly specified in the claims or exemplary embodiments.

The invention claimed is:

1. A switching device, comprising two fixed contacts and one movable contact in a switching chamber, wherein the fixed contacts are arranged in juxtaposition along a longitudinal direction, the switching chamber has a switching chamber wall with opposing transversal sidewall parts and with opposing longitudinal sidewall parts, each of the two fixed contacts has a distance (T) to one of the transversal sidewall parts which is smaller than a respective distance (L) to the longitudinal sidewall parts, wherein the fixed contacts and the movable contact are arranged along the longitudinal direction between permanent magnets, wherein the switching chamber comprises at least one web which is arranged in longitudinal direction between the at least two fixed contacts and which extends from at least one longitudinal sidewall part in transversal direction into the switching chamber.

2. The switching device according to claim 1, wherein the fixed contacts and the movable contact are arranged along the longitudinal direction between permanent magnets, wherein the permanent magnets are arranged outside the switching chamber.

3. The switching device according to claim 2, wherein the permanent magnets are provided and arranged to deflect electric arcs, which may occur during switching operations between a fixed contact and the movable contact, in a transversal direction.

4. The switching device according to claim 2, wherein each of the permanent magnets is arranged on an outer side of a transversal sidewall part facing away from the fixed contacts and the movable contact.

5. The switching device according to claim 2, wherein the fixed contacts are soldered into the openings of the switching chamber.

6. The switching device according to claim 1, wherein the longitudinal sidewall parts have a distance (B) from each other in the transversal direction which substantially corresponds to a distance (K) of the sides of the two fixed contacts facing away from each other in the longitudinal direction.

7. The switching device of claim 1, wherein the at least one web extends in a transversal direction across the movable contact from one of the longitudinal sidewall parts to the other of the longitudinal sidewall parts.

8. The switching device according to claim 7, wherein the at least one web has a recess in which the movable contact can move during a switching operation.

9. The switching device according to claim 7, wherein the switching chamber comprises at least two webs, both of which are arranged in longitudinal direction between the at least two fixed contacts and each of which extends from at least one longitudinal sidewall part in transversal direction into the switching chamber.

10. The switching device according to claim 9, wherein, between the two webs as seen along the longitudinal direction, at least one permanent magnet is arranged in the switching chamber.

11. The switching device according to claim 10, wherein two permanent magnets are arranged symmetrically to the movable contact between the two webs.

12. The switching device according to claim 1, wherein the longitudinal sidewall parts, the transversal sidewall parts and a cover part with openings for the fixed contacts are formed in one piece.

13. The switching device according to claim 1, wherein a gas comprising $H_2$ is contained in the switching chamber.

14. The switching device according to claim 1, wherein the switching chamber comprises a cover part with openings for the fixed contacts, the fixed contacts reach through the openings into the switching chamber, contact regions of the fixed contacts are arranged in the interior of the switching chamber, and the switching chamber base, the switching chamber wall and the cover part form the switching chamber.

15. The switching device according to claim 1, wherein the switching chamber is part of a gas-tight region that completely surrounds a magnet armature as well as the contacts except for parts of the fixed contacts provided for external connection.

16. The switching chamber according to claim 1, wherein the longitudinal sidewall parts, the transversal sidewall parts and the switching chamber base are integrally formed in one piece.

* * * * *